(12) United States Patent
Jeon et al.

(10) Patent No.: US 11,240,817 B2
(45) Date of Patent: Feb. 1, 2022

(54) BANDWIDTH ALLOCATION REQUEST IN CELLULAR MESH NETWORKS

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/781,902

(22) Filed: Feb. 4, 2020

(65) Prior Publication Data

US 2020/0260455 A1 Aug. 13, 2020

Related U.S. Application Data

(60) Provisional application No. 62/802,495, filed on Feb. 7, 2019.

(51) Int. Cl.
| | |
|---|---|
| *H04W 28/06* | (2009.01) |
| *H04W 72/04* | (2009.01) |
| *H04W 72/10* | (2009.01) |
| *H04W 92/20* | (2009.01) |
| *H04W 88/08* | (2009.01) |

(52) U.S. Cl.
CPC ... *H04W 72/0486* (2013.01); *H04W 72/0413* (2013.01); *H04W 72/10* (2013.01); *H04W 88/08* (2013.01); *H04W 92/20* (2013.01)

(58) Field of Classification Search
CPC ......... H04W 72/0486; H04W 72/0413; H04W 72/10; H04W 88/08; H04W 92/20

USPC ............... 370/329, 310.2; 455/550.1, 561
See application file for complete search history.

(56) References Cited

U.S. PATENT DOCUMENTS

| | | | |
|---|---|---|---|
| 9,775,064 | B2 | 9/2017 | Zhao |
| 10,182,370 | B2 | 1/2019 | Sun et al. |
| 10,637,588 | B1 * | 4/2020 | Lin ........ H04W 16/32 |

(Continued)

FOREIGN PATENT DOCUMENTS

| | | |
|---|---|---|
| CN | 103458526 B | 7/2017 |
| WO | 2015041408 A1 | 3/2015 |

OTHER PUBLICATIONS

Ericsson, "Uplink Scheduling in IAB Networks", 3GPP TSG-RAN WG2 Meeting #103b, Oct. 8-12, 2018, R2-1814365, 6 pages.

(Continued)

*Primary Examiner* — Danh C Le

(57) ABSTRACT

A base station (BS) in a wireless communication network for bandwidth allocation requests (BARs) and method of operating the BS. The method includes receiving an uplink (UL) BAR for an amount of UL resources for transmission of UL data to the BS and determining, based at least in part on the UL BAR, an amount of backhaul resources for transmission of backhaul data from the BS to a parent BS of the BS via a wireless backhaul connection. The method further includes receiving the UL data; transmitting, to the parent BS at least before reception of the UL data is complete, a first BAR indicating the determined amount of the backhaul resources; and transmitting the received UL data to the parent BS via the wireless backhaul connection based on the first BAR.

20 Claims, 13 Drawing Sheets

(56) References Cited

U.S. PATENT DOCUMENTS

| | | | |
|---|---|---|---|
| 10,645,689 B2* | 5/2020 | Abedini | H04W 24/10 |
| 2009/0113086 A1 | 4/2009 | Wu et al. | |
| 2009/0125650 A1 | 5/2009 | Sebire | |
| 2010/0322144 A1 | 12/2010 | Lee et al. | |
| 2011/0216691 A1 | 9/2011 | Lim et al. | |
| 2012/0039208 A1* | 2/2012 | Aydin | H04B 7/022 370/252 |
| 2012/0069805 A1 | 3/2012 | Feuersanger et al. | |
| 2015/0335877 A1* | 11/2015 | Jeffery | A61N 1/0492 607/139 |
| 2016/0057679 A1* | 2/2016 | Werner | H04W 52/04 455/444 |
| 2016/0234698 A1* | 8/2016 | Thyni | H04W 24/02 |
| 2016/0381615 A1* | 12/2016 | Nagaraja | H04W 36/0061 455/436 |
| 2017/0078916 A1* | 3/2017 | Wang | H04L 69/08 |
| 2018/0098332 A1* | 4/2018 | Shi | H04W 72/0406 |
| 2019/0045401 A1* | 2/2019 | Zhang | H04W 28/20 |
| 2020/0336382 A1* | 10/2020 | Hong | H04W 88/14 |

OTHER PUBLICATIONS

Sony, "Resource allocation in IAB", 3GPP TSG RAN WG2 Meeting #103bis, Oct. 8-12, 2018, R2-1814733, 3 pages.

Vivo, "Selection of Parent for IAB-Node", 3GPP TSG-RAN WG2 Meeting #104, Nov. 12-16, 2018, R2-1816509, 3 pages.

Notification of Transmittal of the International Search Report and the Written Opinion of the International Searching Authority, or the Declaration dated May 20, 2020 in connection with International Patent Application No. PCT/KR2020/001741, 10 pages.

"3rd Generation Partnership Project; Technical Specification Group Radio Access Network; NR; Study on Integrated Access and Backhaul; (Release 16)", 3GPP Technical Report 3GPP TR 38.874 V16.0.0, Dec. 2018, 111 pages.

* cited by examiner

US 11,240,817 B2

BANDWIDTH ALLOCATION REQUEST IN CELLULAR MESH NETWORKS

CROSS-REFERENCE TO RELATED APPLICATIONS AND CLAIM OF PRIORITY

The present application claims priority to U.S. Provisional Patent Application No. 62/802,495, filed on Feb. 7, 2019. The content of the above-identified patent document is incorporated herein by reference.

TECHNICAL FIELD

The present application relates generally to wireless communication systems, more specifically, the present disclosure relates to bandwidth allocation request (BAR) procedures in cellular mesh networks.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates to BAR procedures in cellular mesh networks.

In one embodiment, method of operating a BS in a wireless communication network is provided. The method includes receiving an UL BAR for an amount of UL resources for transmission of UL data to the BS and determining, based at least in part on the UL BAR, an amount of backhaul resources for transmission of backhaul data from the BS to a parent BS of the BS via a wireless backhaul connection. The method further includes receiving the UL data; transmitting, to the parent BS at least before reception of the UL data is complete, a first BAR indicating the determined amount of the backhaul resources; and transmitting the received UL data to the parent BS via the wireless backhaul connection based on the first BAR.

In another embodiment, a BS in a wireless communication network is provided. The BS includes a transceiver configured to receive an UL BAR for an amount of UL resources for transmission of UL data to the BS and a processor operably connected to the transceiver. The processor is configured to determine, based at least in part on the UL BAR, an amount of backhaul resources for transmission of backhaul data from the BS to a parent BS of the BS via a wireless backhaul connection. The transceiver is further configured to receive the UL data; transmit, to the parent BS at least before reception of the UL data is complete, a first BAR indicating the determined amount of the backhaul resources; and transmit the received UL data to the parent BS via the wireless backhaul connection based on the first BAR.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
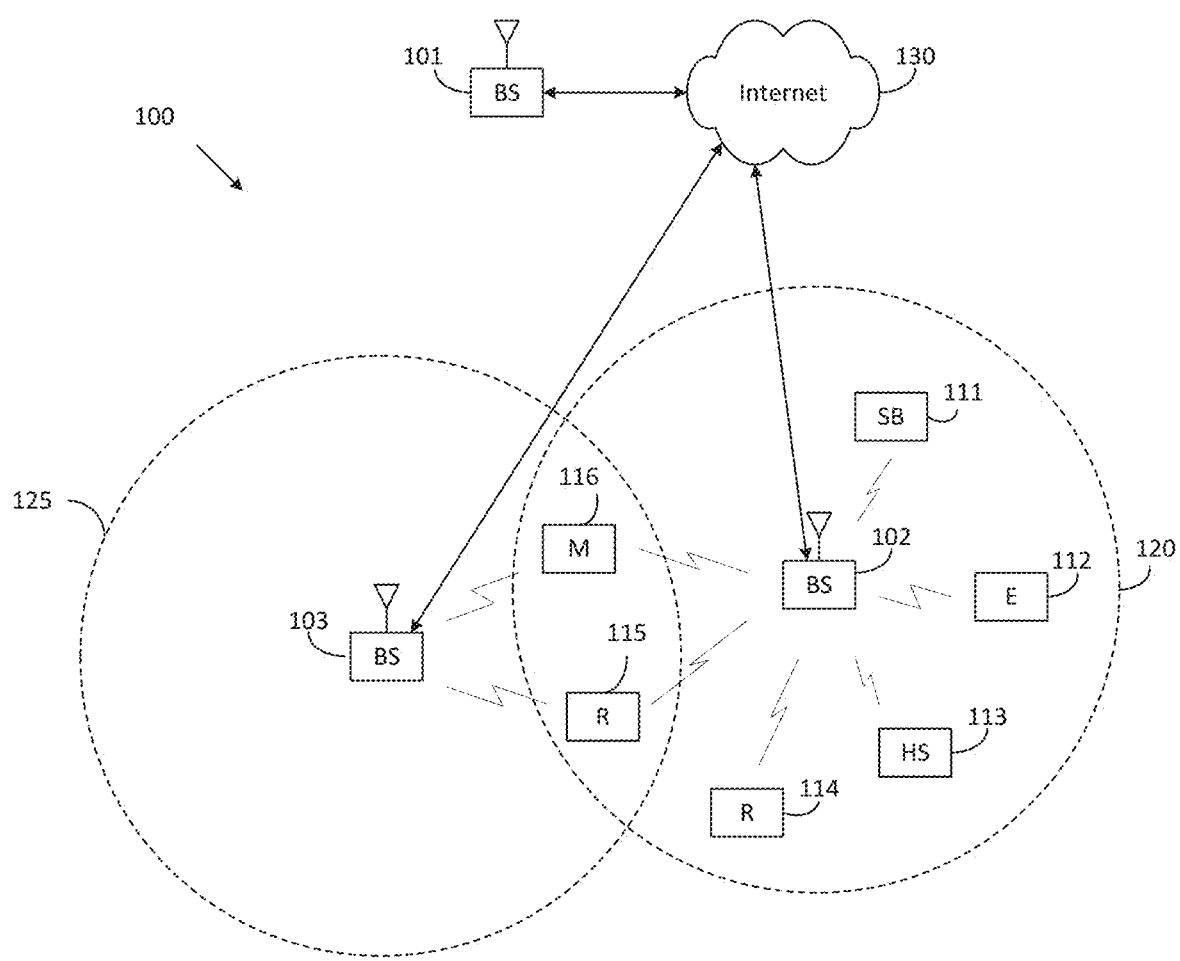
FIG. 1 illustrates an example wireless network according to embodiments of the present disclosure.
Figure 2:
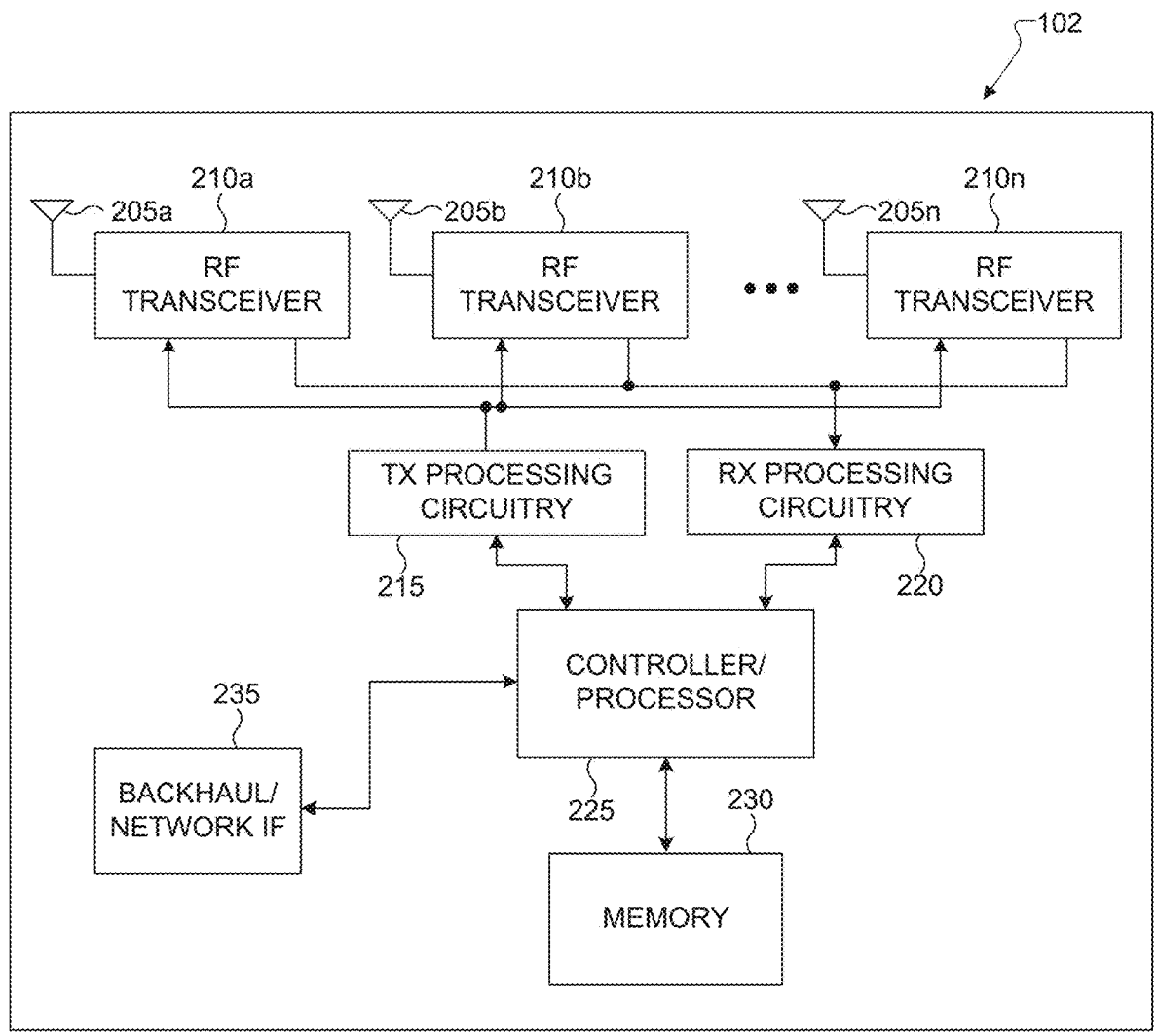
FIG. 2 illustrates an example gNB according to embodiments of the present disclosure.
Figure 3:
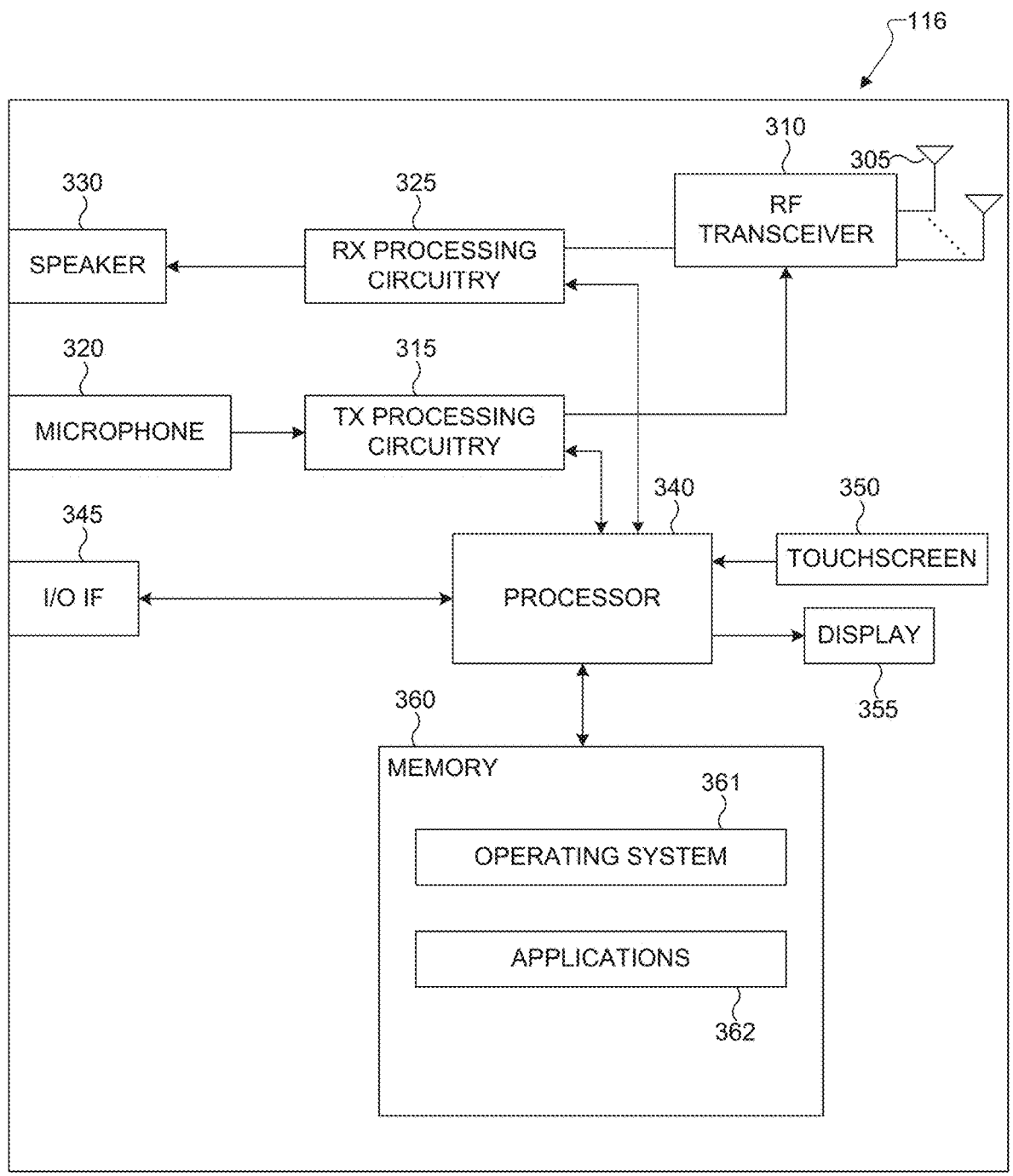
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient BAR procedures in a cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB (or BS) 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a DL that refers to transmissions from a base station or one or more transmission points to UEs and UL that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT preceding that is known as DFT-spread-OFDM.

Figure 4:
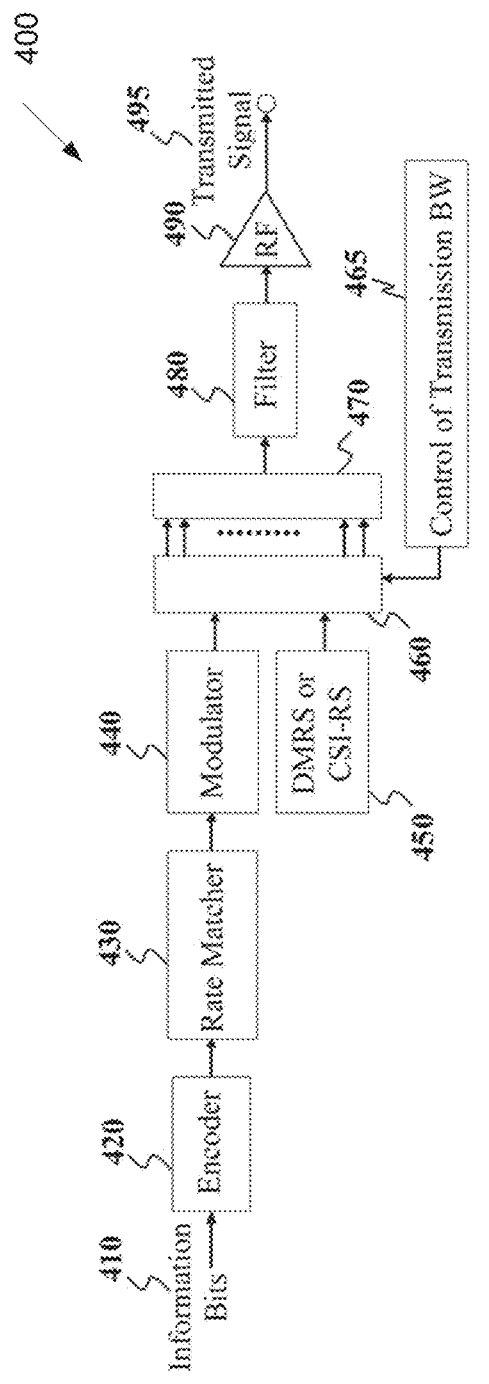
FIG. 4 illustrates an example transmitter structure using OFDM according to embodiments of the present disclosure.

FIG. 4 illustrates an example transmitter structure 400 using OFDM according to embodiments of the present disclosure. For example, the transmitter structure 400 may be implemented in the UE 116 or the gNB 102. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
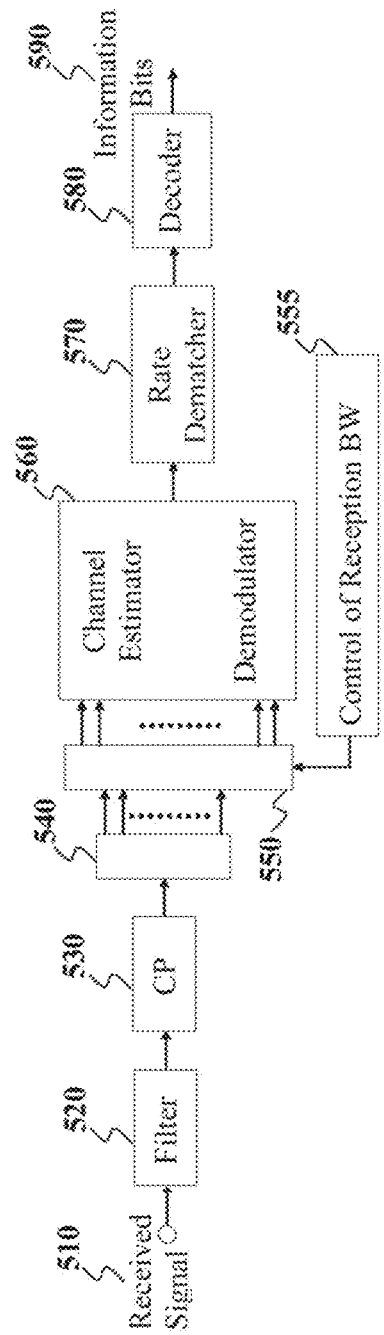
FIG. 5 illustrates an example receiver structure using OFDM according to embodiments of the present disclosure.

FIG. 5 illustrates an example receiver structure 500 using OFDM according to embodiments of the present disclosure. For example, the receiver structure 500 may be implemented in the UE 116 or the gNB 102. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
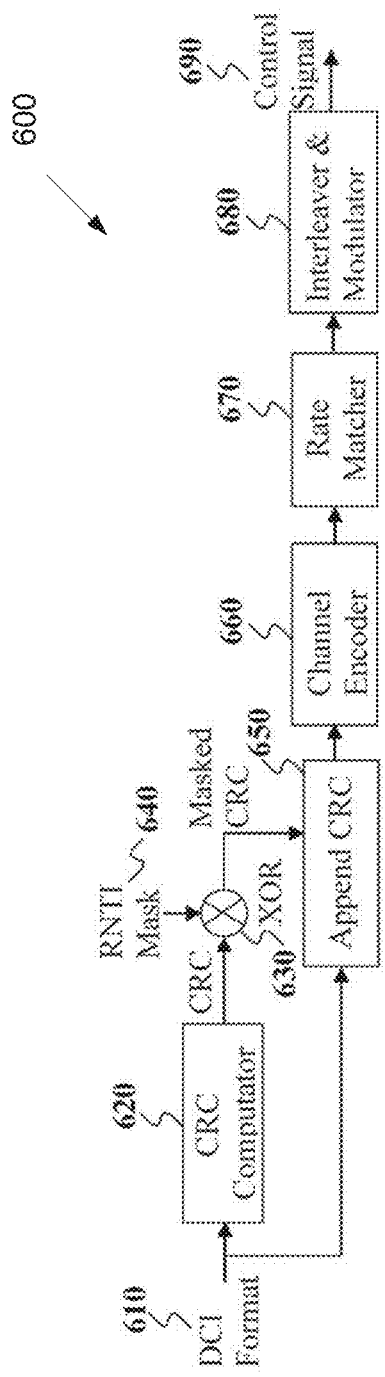
FIG. 6 illustrates an example encoding process for a DCI format according to embodiments of the present disclosure.

FIG. 6 illustrates an example encoding process 600 for a DCI format according to embodiments of the present disclosure. For example, the encoding process 600 may be implemented in the gNB 102. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
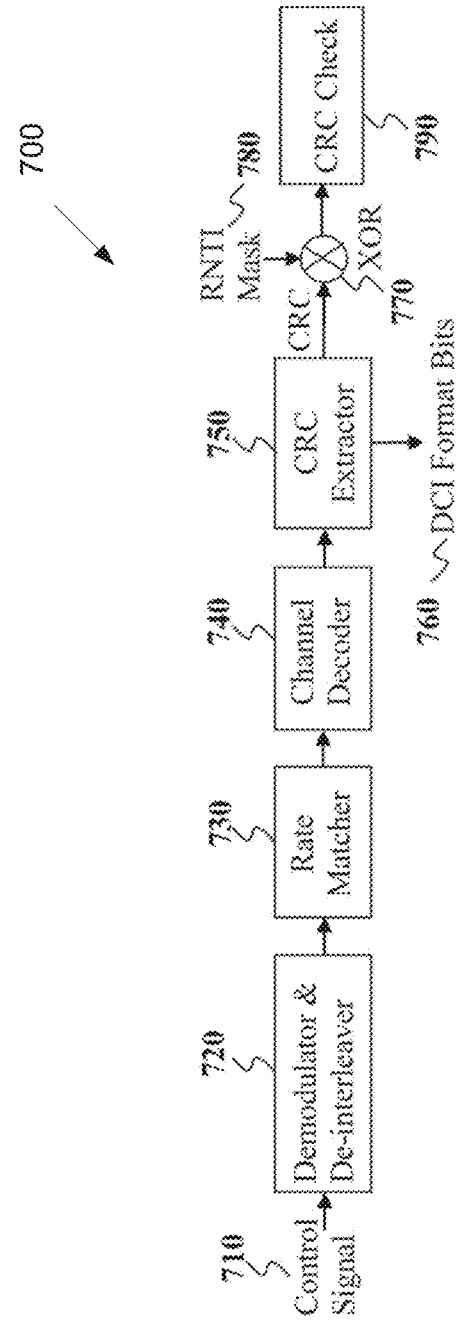
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. For example, the decoding process 700 may be implemented in the UE 116. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

However, the deployment locations and density of conventional BSs is limited by the availability of expensive fiber backhaul.

Figure 8:
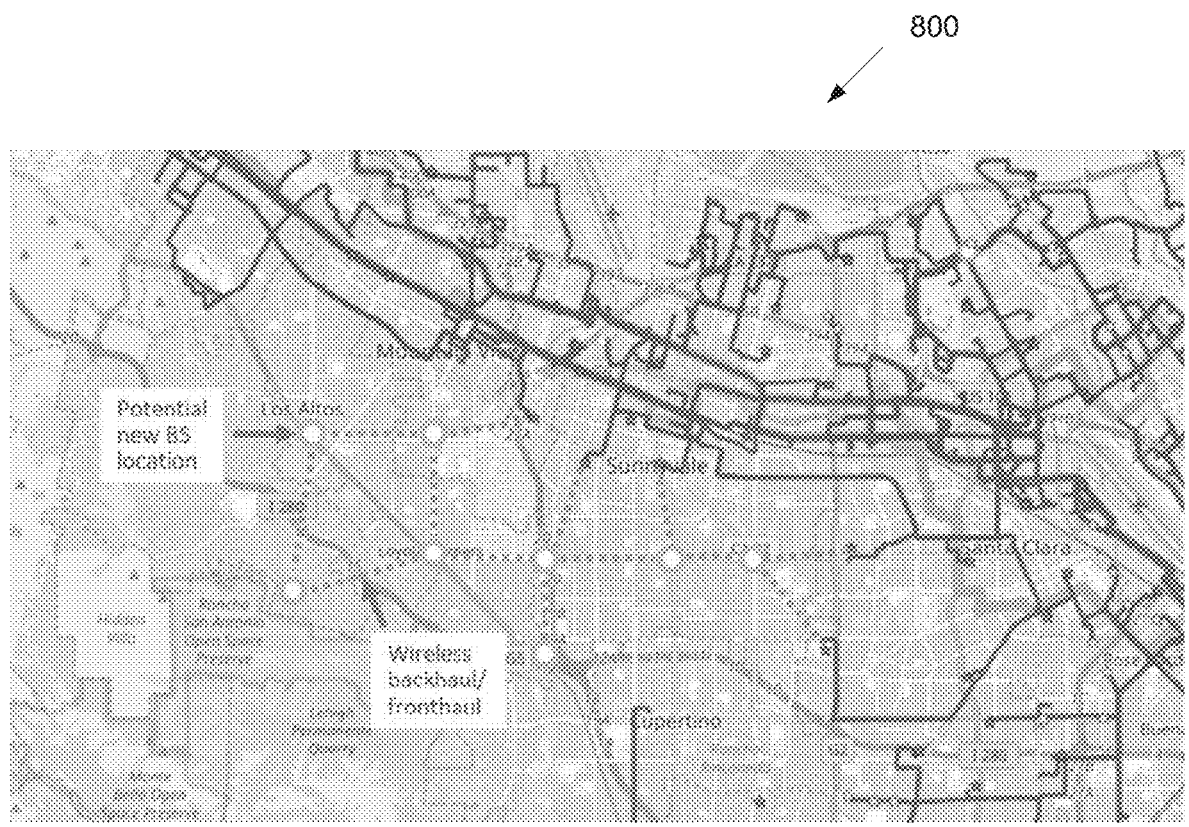
FIG. 8 illustrates an example fiber and BS deployment according to embodiments of the present disclosure.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8 i.e., multi-connectivity and multi-hop functionality can be supported. A deployed network with such capabilities is referred to as a wireless mesh network.

Figure 9:
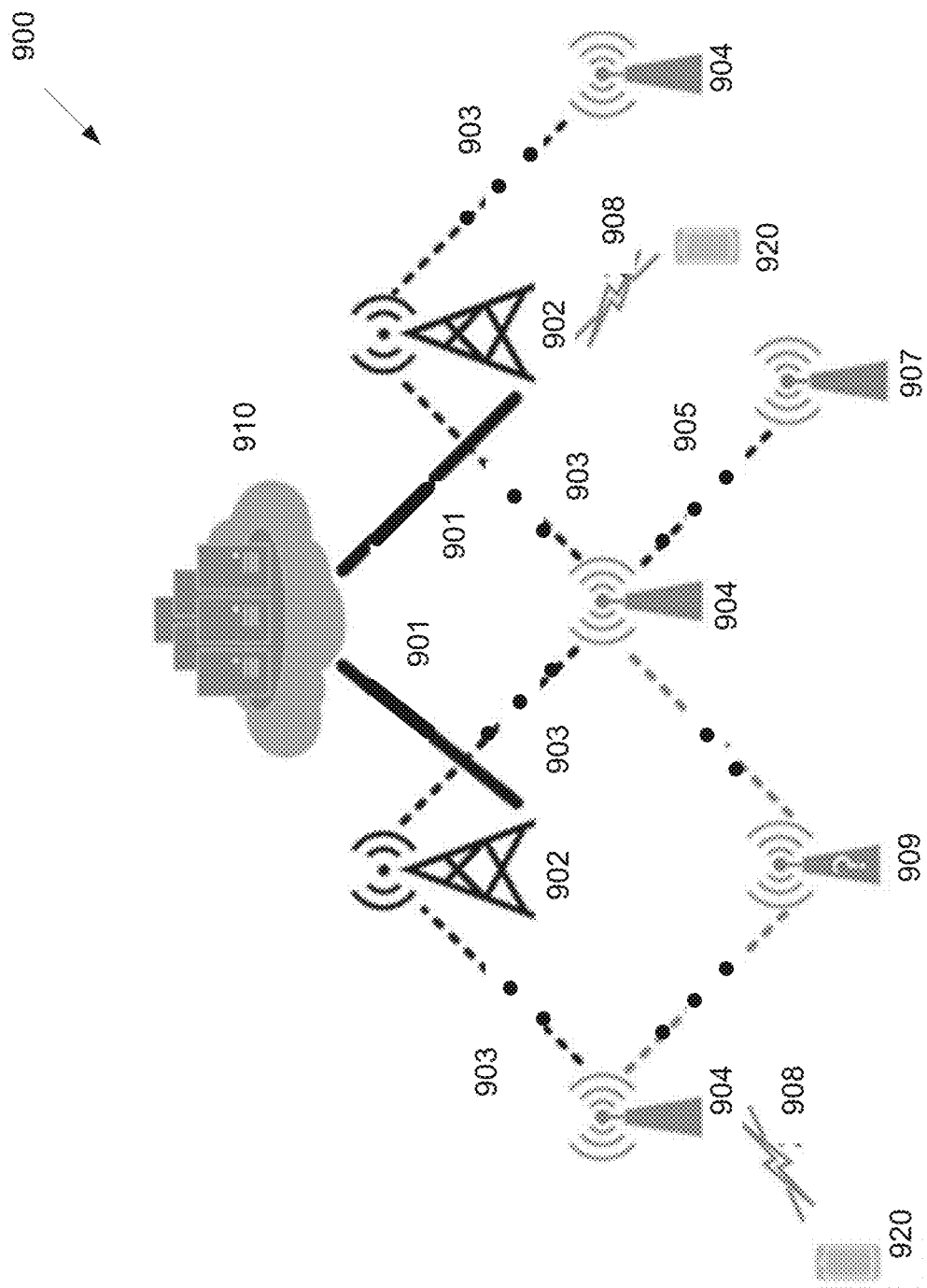
FIG. 9 illustrates an example multi-hop wireless backhaul mesh network according to embodiments of the present disclosure.

FIG. 9 illustrates an example multi-hop wireless backhaul mesh network 900 according to embodiments of the present disclosure. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network 900 is provided in FIG. 9. The network 900 includes a plurality of BS 902, 904, 907, and 909, which may be examples of gNB 102, and a plurality of UEs 920, which may be examples of UE 116. Referring to FIG. 9, a gateway BS 902 may be connected to the core network 910 by a fiber/wired backhaul link 901. Similarly, a mesh BS 904 may be connected to a gateway BS 902 via a wireless interface 903, and a mesh BS 907 may be wirelessly connected to a mesh BS 904 via a wireless interface 905. A UE 920 can be connected either to a mesh BS or to a gateway BS via a wireless access link 908. The downlink backhaul traffic to a mesh BS 904 can be routed from the core network 910 to a gateway BS 902 through fiber/wired backhaul interface 901 and then transmitted to the BS 904 (e.g., mesh BS(s)) through the wireless interface 903.

The uplink backhaul traffic from the mesh BS 904 may be transmitted through the wireless interface 903 to the gateway BS 902 and then routed to the core network 910 by the fiber/wired backhaul interface 901. Similarly, the downlink backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS.

The mesh BSs 904, 907 with already existing single hop (e.g., 903) or the multi-hop (e.g., 903-905) backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

In a cellular mesh network, it may be preferable to reduce a latency incurred over wireless fronthaul/backhaul links. In particular, a UL scheduling latency is of interest as a parent mesh BS, e.g., 902, which may first need to recognize the need for UL data transmission from a child mesh BS(s), e.g., 904, over wireless links, e.g., 903. Such recognition at a parent mesh BS may involve a reception of certain request message(s) from a child mesh BS. Techniques, apparatus and methods are disclosed that define the aforementioned scheduling request procedure including but not limited to designs reducing delays involved in such procedures. In various embodiments of the present disclosure, BARs are utilized, which may be transmitted from one BS to another BS in a mesh network to inform the need of UL data transmission and the needed bandwidth.

Figure 10:
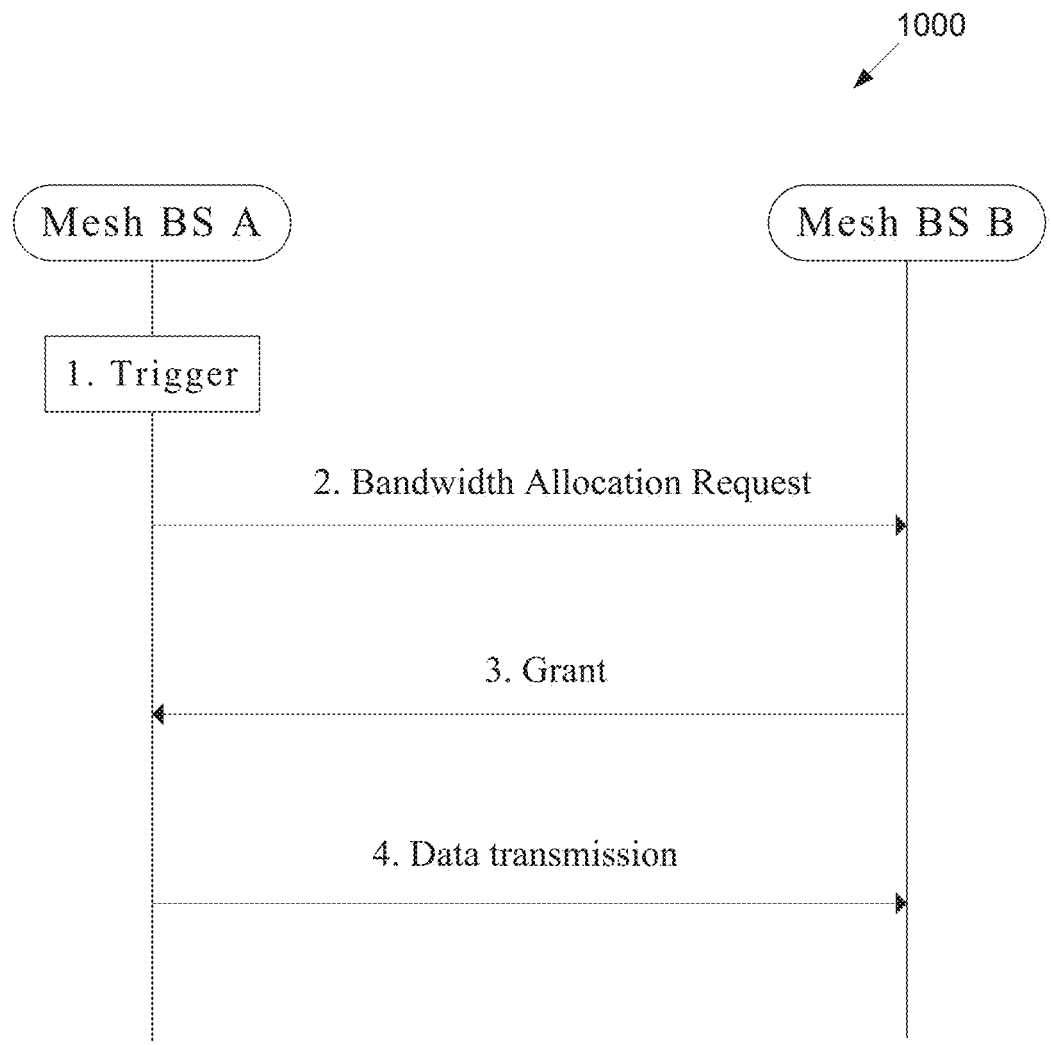
FIG. 10 illustrates an example BAR procedure according to embodiments of the present disclosure.

FIG. 10 illustrates an example BAR procedure 1000 according to embodiments of the present disclosure. The embodiment of the BAR procedure 1000 illustrated in FIG. 10 is for illustration only. FIG. 10 does not limit the scope of the present disclosure to any particular implementation.

FIG. 10 illustrates an example of a bandwidth allocation procedure from both requesting and responding BS perspectives. As illustrated in FIG. 10, a base station (e.g., 101-103 as illustrated in FIG. 1) may be implemented as a mesh BS A and a mesh BS B. A mesh BS A and a mesh BS B as illustrated in FIG. 10 can be a child mesh BS and a parent mesh BS, respectively. The mesh BS A transmits a BAR triggered by a certain event. Such triggering event can be an arrival of data or an expiration of timer.

The BAR message can indicate the requested amount of resources for data transmission. In one example, the requested amount of resources can be indicated in terms of the amount of buffered data at mesh BS A. In another example, the requested amount of resources can be indicated in terms of the frequency and/or time and/or code resources.

As illustrated in FIG. 10, a step 2 may comprise one or multiple message transmissions. In the latter case, the actual BAR transmission may be preceded by the transmission of a message indicating the need to transmit the BAR from mesh BS A and the granting from mesh BS B for BAR transmission from mesh BS A.

In one embodiment, the BAR message is sent from a child mesh BS to a parent mesh BS(s) upon the arrival of traffic in an upstream data buffer. As an example, it can be such that the BAR is sent only when higher priority traffic than what are currently buffered arrives. In another embodiment, the BAR message is sent in a periodic manner. In yet another embodiment, the BAR message is included whenever an allocated UL bandwidth is not fully utilized and there is an unused resourced to be zero-padded. In yet another embodiment, the BAR can be sent upon the reception of request message from a parent BS. In yet another embodiment, the BAR can be sent in a grant-free manner. That is BAR can be transmitted in one of configured grant resources without an explicit grant.

In one embodiment, the BAR messages received from child mesh BS(s)/UE(s) can be forwarded by the current mesh node to upper nodes, i.e., parent mesh BS of the current mesh node. If the current mesh node is connected to gateway BS, then the upper node may be a gateway BS. As one example, the forwarded BAR messages may not be combined and may be separately forwarded to parent mesh node. Through this forwarding mechanism, the gateway BS may receive the individual BARs from all the end mesh BSs/UEs and can identify the local congestion situation.

In another example, the individual BARs can be combined at the current mesh node and forwarded. The combination can be done among the access link traffic from UEs and among the backhaul/fronthaul link traffic from child mesh nodes. In other words, a mesh BS transmits combined {access link, backhaul/fronthaul link} BARs to upper nodes, which are then forwarded individually by parent mesh BS towards the gateway BS. In one embodiment, only the ratio of {access link, backhaul/fronthaul link} traffic may be sent. In yet another example, the combination can be done per QoS class.

In one embodiment, when the current mesh node has more than one parent mesh BSs, the BAR forwarding can be performed towards one parent mesh BS, called master parent mesh BS. In another embodiment, the forwarding can be performed to more than one parent mesh BSs. As an example, the BAR forwarding can be performed via multi-path transmission. As another example, the BAR forwarding can be duplicated, and the same copies can be sent to multiple parent BSs.

In one embodiment, the BAR is based on the actual available amount of data at the requesting node, i.e., mesh BS A as illustrated in FIG. 10. Such BAR is referred to as actual BAR in this disclosure.

Figure 11:
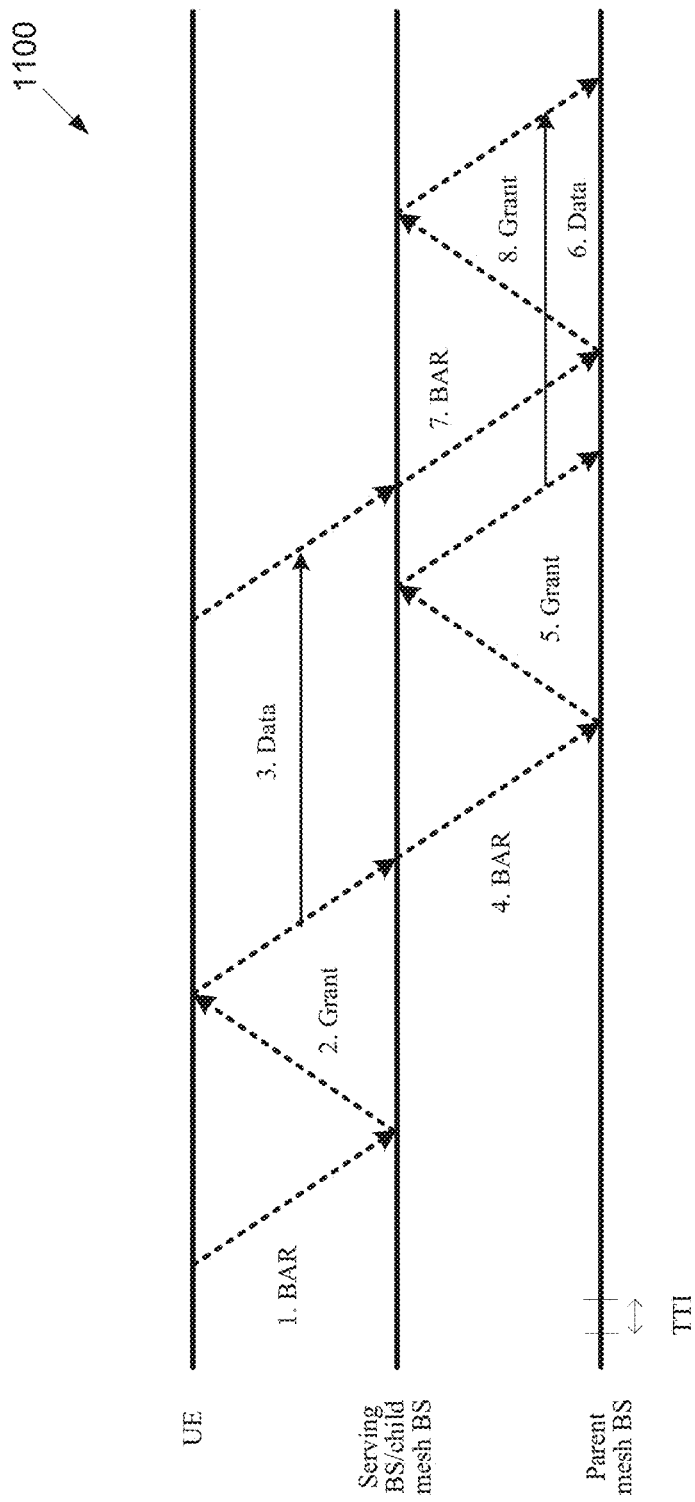
FIG. 11 illustrates an example signal flow diagram for an actual BAR procedure according to embodiments of the present disclosure.

FIG. 11 illustrates an example signal flow diagram for an actual BAR procedure 1100 according to embodiments of the present disclosure. The embodiment of the actual BAR procedure 1100 illustrated in FIG. 11 is for illustration only. FIG. 11 does not limit the scope of the present disclosure to any particular implementation. As illustrated in FIG. 11, a base station (e.g., 101-103 as illustrated in FIG. 1) may be implemented as a serving BS, child mesh BS, and/or a parent mesh BS. Additionally, while FIG. 11 illustrates a signal flow among a UE and BSs (i.e., access link and backhaul links), a similar procedure may be performed among only BSs (i.e., on backhaul links).

FIG. 11 is an example of a bandwidth allocation procedure from both requesting and responding BS perspectives based on an actual BAR in accordance with embodiments disclosed herein. As used herein, an actual BAR is a BAR based on data actually received/buffered for transmission. In operation 1, a UE (or child BS) transmits BAR for an UL data transmission. In operation 2, the serving BS of the corresponding UE (or child BS) transmits UL grants. In operation 3, the UE (or child BS) transmits UL data to the serving BS. The serving BS, which is a child mesh node of the parent mesh transmits BAR to the parent mesh BS in operation 4. In the actual BAR, the BAR is based on the available amount of data at the time of message encoding. In this example, the BAR in operation 4 may only request small amount of bandwidth as the child mesh BS itself just started receiving data from a UE (or child BS).

Based on the received BAR, the parent mesh BS transmits a grant in operation 5. Data transmission at the child mesh BS is executed in operation 6. Since the BAR is based on the available amount of data at the time of message encoding, the additional BAR from child mesh BS is sent until there is new data arrival to obtain UL grant. This is shown by operation 7 and 8 in FIG. 11. In this example, the BAR is sent by the serving/child mesh BS to the parent BS before receiving an entirety of the UL data indicated in the BAR received in operation 1. In this manner, latency can be reduced in the network despite the multiple-hop network connections in the backhaul.

Figure 12:
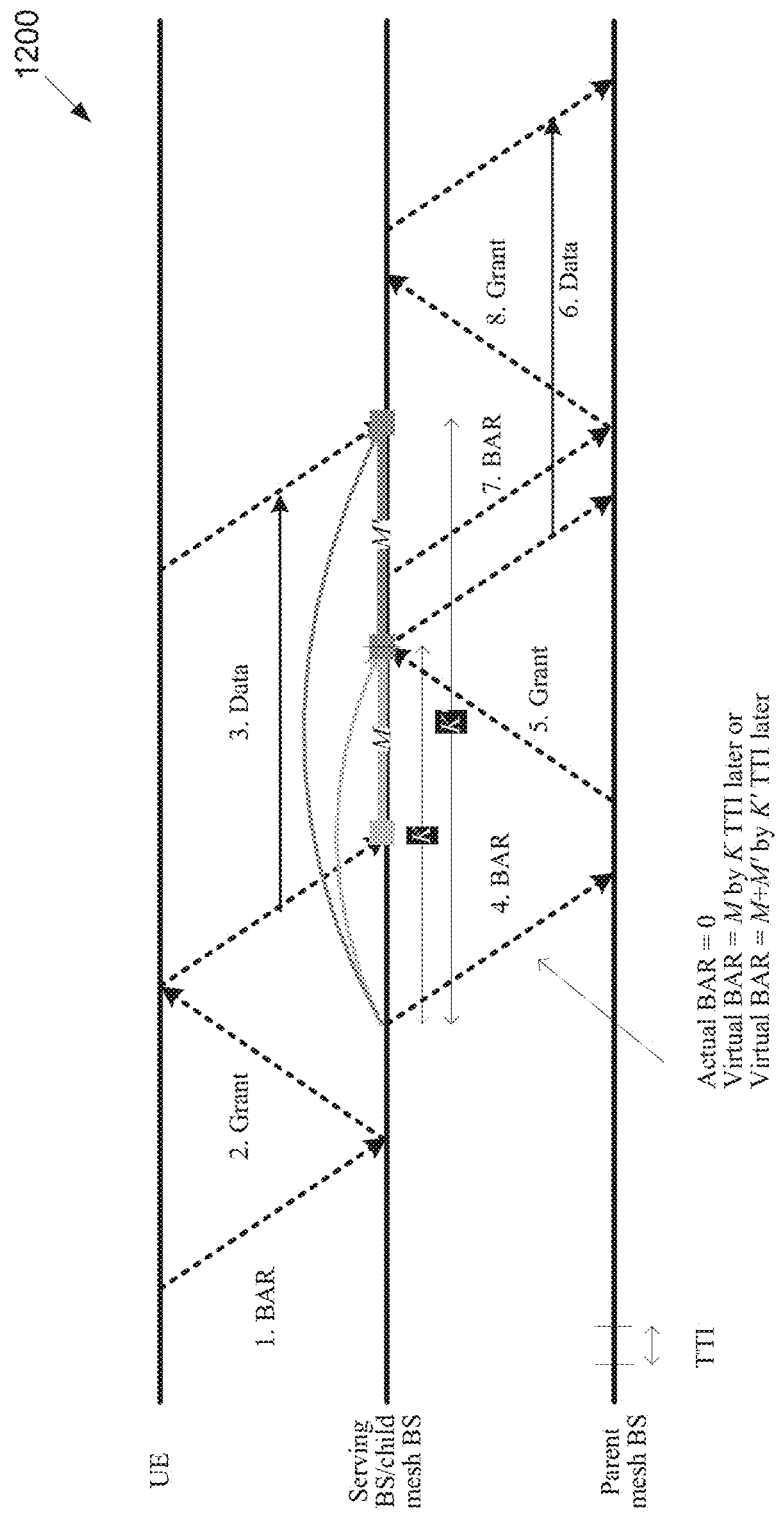
FIG. 12 illustrates an example signal flow diagram for a virtual BAR procedure according to embodiments of the present disclosure

FIG. 12 illustrates an example signal flow diagram for a virtual BAR procedure 1200 according to embodiments of the present disclosure. The embodiment of the virtual BAR 1200 illustrated in FIG. 12 is for illustration only. FIG. 12 does not limit the scope of the present disclosure to any particular implementation. As illustrated in FIG. 12, a base station (e.g., 101-103 as illustrated in FIG. 1) may be implemented as a serving BS, child mesh BS, and/or a parent mesh BS. FIG. 12 is an example of a bandwidth allocation procedure from both requesting and responding BS perspectives based on virtual BAR consistent with embodiments disclosed herein. Additionally, while FIG. 12 illustrates a signal flow among a UE and BSs (i.e., access link and backhaul links), a similar procedure may be performed among only BSs (i.e., on backhaul links).

In these embodiments, the BAR is based on the projected amount of data to be available in the future at the requesting node. Such BAR is referred to as virtual BAR in the present disclosure. In various embodiments, the virtual BAR can include request for time/frequency/code resources based on both actual amount of data at the time of preparing the BAR as well as the projected amount of data to be available in the future. In this case, the BAR may also include a time stamp of when the requested resources are desired. In various embodiments, a single BAR may contain several such (resource, time stamp) pairs. The BAR may include expiration timer which indicate the time from which the virtual BAR request would be obsolete and not valid.

As illustrated, in operation 1, a UE (or child BS) transmits BAR for an UL data transmission. In operation 2, the serving BS of the corresponding UE (or child BS) transmits UL grants to the UE (or child BS). In operation 3, the UE (or child BS) transmits UL data to the serving BS. The serving BS, which is a child mesh node of the parent mesh transmits BAR to the parent mesh BS in operation 4. The virtual BAR in operation 4 can precede the first instance of actual data arrival from UE (or child BS) in operation 3 as it is based on the projected amount of data to be available in the future. In this manner, backhaul latency can further be reduced in the network despite the multiple-hop network connections in the backhaul.

The child mesh BS can predict the future data arrival from the BAR received from associated UEs and own UL scheduling. When a mesh BS transmits virtual BAR to the parent mesh BS, the mesh BS first needs to determine how far the mesh BS may look forward. For example, the child mesh BS may take time instance that is K TTI later from the current instance to determine the projected amount of data arrival M. There may be a tradeoff relationship in deciding how far to look into in the future. That is, if too farther instance is taken, more bandwidth can be requested, but the parent mesh BS may delay the bandwidth allocation as the parent mesh BS does not have a microscopic view on the data arrival schedule within the indicated timeline K. Further, the time at which the entirety of the data indicated in the BAR from the UE is identified as K' and the amount of data expected to arrive after time K is M'. Thus, the BS may indicate pair(s) of time stamps and resource amounts in the BAR. For example, M amount of resources by K time, M' amount data by K', and any additional timestamp/resource amount pairs therebetween.

In one embodiment K may be a fixed value, while in another embodiment, K is adapted at each mesh BS based on the regularity/predictability of the incoming uplink traffic. Based on the received BAR, the parent mesh BS transmits grant in operation 5. Data transmission at the child mesh BS is executed in operation 6. The BAR can be updated as in operation 7 as more data is projected to arrive along with the current up-to-date actual available amount of data.

Figure 13:
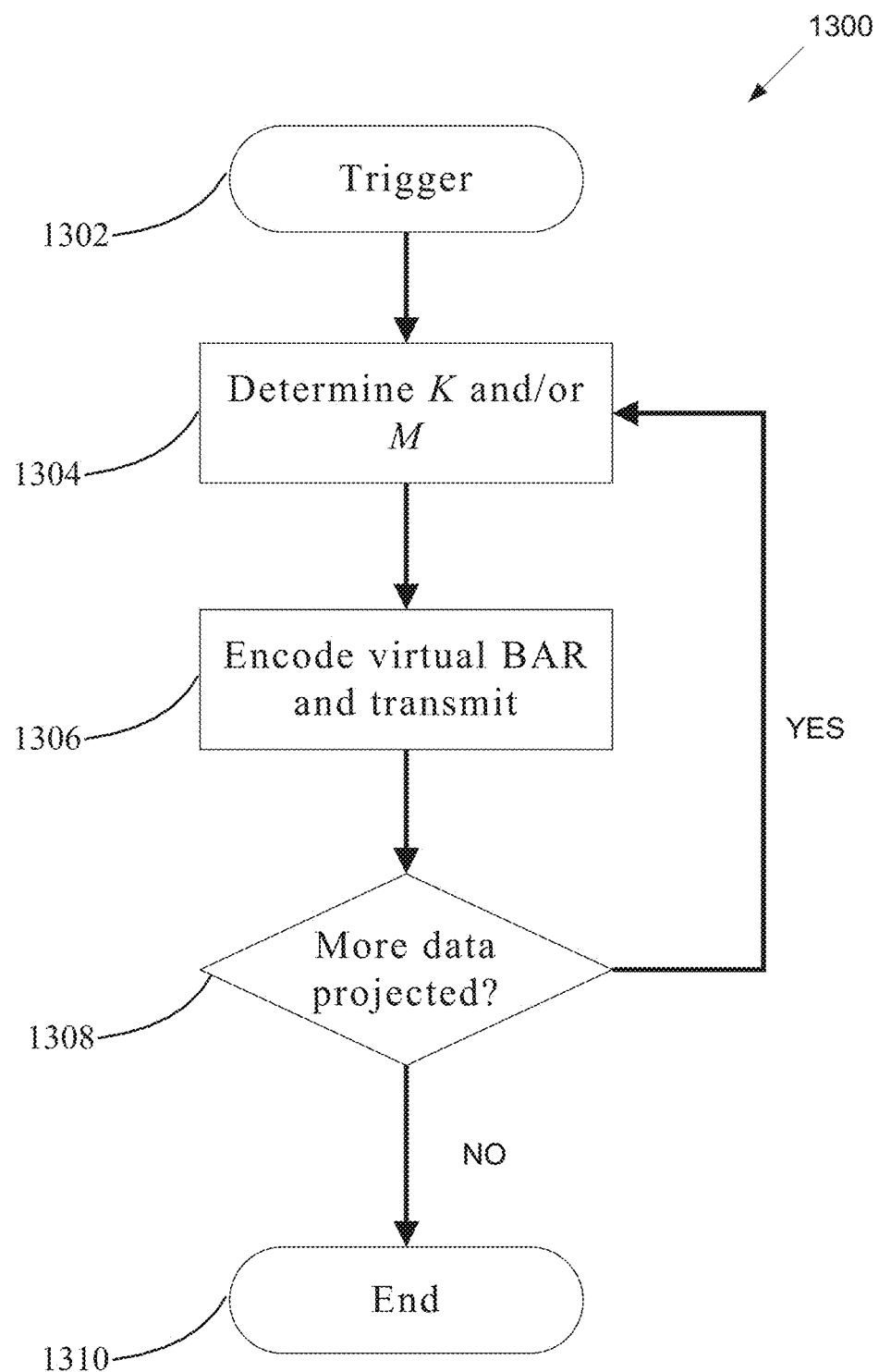
FIG. 13 illustrates a flowchart of a method for virtual BAR transmission according to embodiments of the present disclosure.

FIG. 13 illustrates a flowchart of a method 1300 for virtual BAR transmission according to embodiments of the present disclosure, as may be performed by a BS (e.g. 101-103 as illustrated in FIG. 1). The embodiment of the method 1300 illustrated in FIG. 13 is for illustration only. FIG. 13 does not limit the scope of the present disclosure to any particular implementation.

As illustrated in FIG. 13, the method 1300 begins at step 1302. In step 1302, a BS is triggered to transmit a virtual BAR. Examples of such triggering events can be the reception of BARs from associated UEs or own transmission of UL grants to the associated UEs as illustrated in FIG. 12 or any of the triggering events identified with regard to FIG. 10. In step 1304, the mesh BS determines how far to look into the future, K, and/or the amount of projected data arrival, M (e.g., as discussed above with regard to FIG. 12). Accordingly, the virtual BAR is encoded and transmitted in step 1306. In step 1308, if more data is projected to arrive, then the flow directs to step 1304. Otherwise, the flow directs to step 1310.

Figure 14:
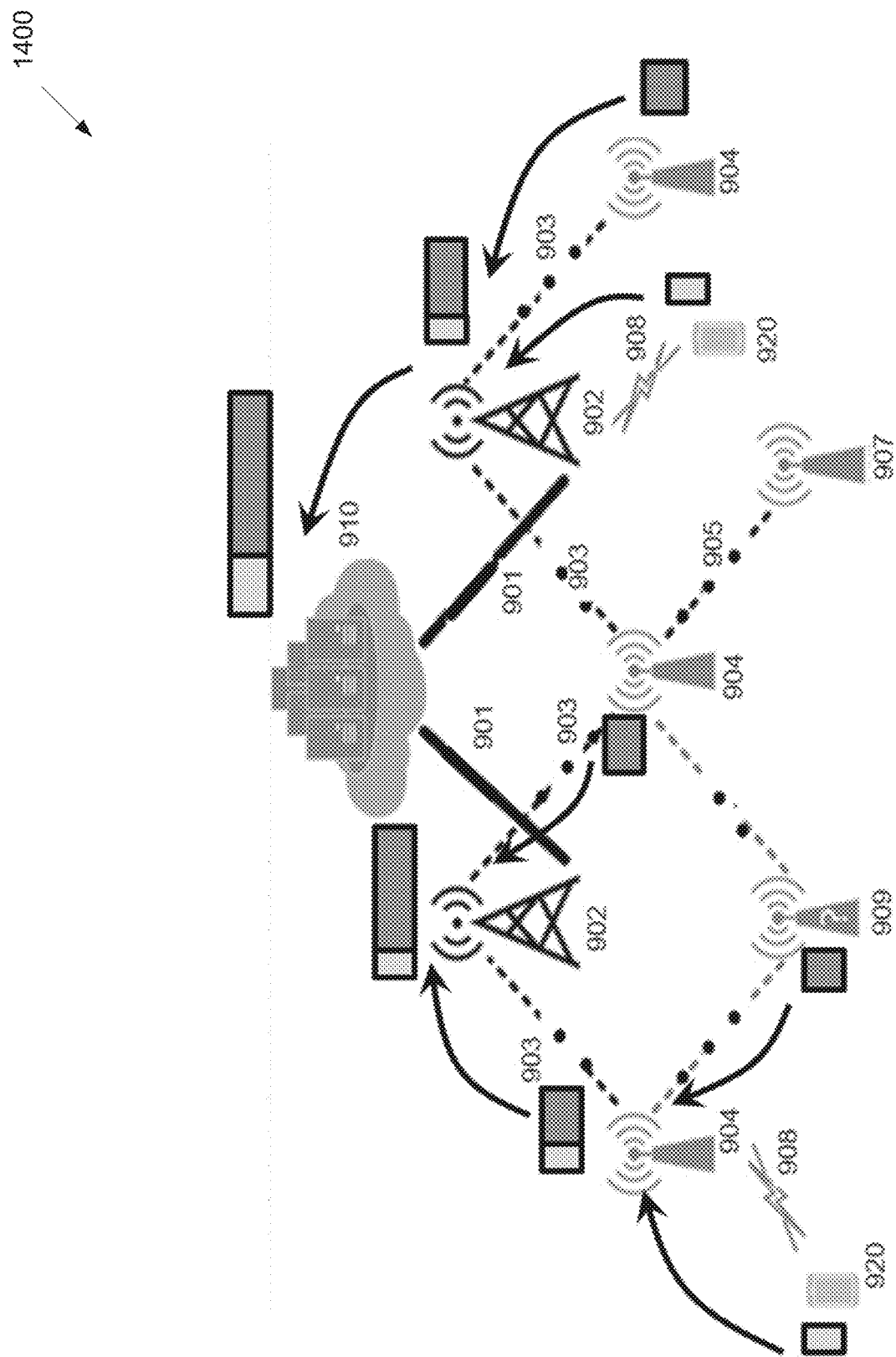
FIG. 14 illustrates an example of BAR forwarding/combining in multi-hop wireless backhaul mesh network according to embodiments of the present disclosure.

FIG. 14 illustrates an example of BAR forwarding/combining in multi-hop wireless backhaul mesh network 1400 according to embodiments of the present disclosure. For example, the network 1400 is an example of one implementation of the network 900 where BAR forwarding/combining is utilized. In this illustrative embodiment, the BARs (access link amounts illustrated in a lighter color and backhaul amounts illustrated in a darker color) are forwarded/combined and sent upstream to the core network 910. The embodiment of the multi-hop wireless backhaul mesh network 1400 illustrated in FIG. 14 is for illustration only. FIG. 14 does not limit the scope of the present disclosure to any particular implementation.

In various embodiments, the BAR messages received from child mesh BS(s) 904/UE(s) 920 can be forwarded by the current mesh node to upper nodes, i.e., parent mesh BS of the current mesh node. For example, if the current mesh node 904 is connected to gateway BS 902, then the upper node may be a gateway BS 902. As one example, the forwarded BAR messages may not be combined (or aggregated) and separately forwarded to parent mesh node. Through this forwarding mechanism, the gateway BSs 902 or core network 910 may receive the individual BARs from all the end mesh BS s/UEs, identify the local congestion situation, and act, for example determine UL/DL resource split or access/backhaul resource split.

In another example, the individual BARs can be combined at the current mesh node and forwarded. The combination can be done among the access link traffic from UEs and among the backhaul/fronthaul link traffic from child mesh nodes. In other words, a mesh BS transmits combined (e.g., access link, backhaul/fronthaul link) BARs to upper nodes, which are then forwarded individually by parent mesh BS towards the gateway BS. In one embodiment, only the ratio of (e.g., access link to backhaul/fronthaul link) traffic may be sent. In yet another example, the combination can be done per QoS class.

In various embodiments, the BAR forwarding/combining can be conditional/controlled. For example, the core network 910 (or a gateway BS 902) signals control information regarding BAR forwarding/combining to a particular BS on the BAR forwarding which may include the following information: an indication to begin/stop forwarding the BAR, a forwarding duration (which may be predefined using a timer), an indication to combine or separately forward the BARs, and the combining option, if applicable. Additionally or alternatively, a BS is triggered to forward BAR upon occurrence of one or more of the following conditions (i) a volume of requested bandwidth allocation from its UEs/child BSs, received during a certain time duration or received but not processed by the time, exceeds: a certain absolute threshold, a certain threshold relative to the current volume of granted bandwidth allocation to its UEs/child BSs, the traffic volume that can be supported within the current D/U/F resource pattern, a certain threshold relative to the amount of buffered DL data at the BS; (ii) a serving parent BS of the BS is switched from one to another; (iii) a change in a path metric to the gateway BS exceeds a certain threshold; and (iv) a change in a link condition to a parent BS, e.g., RSRP/RSRQ/RSSI, exceeds a certain threshold.

Figure 15:
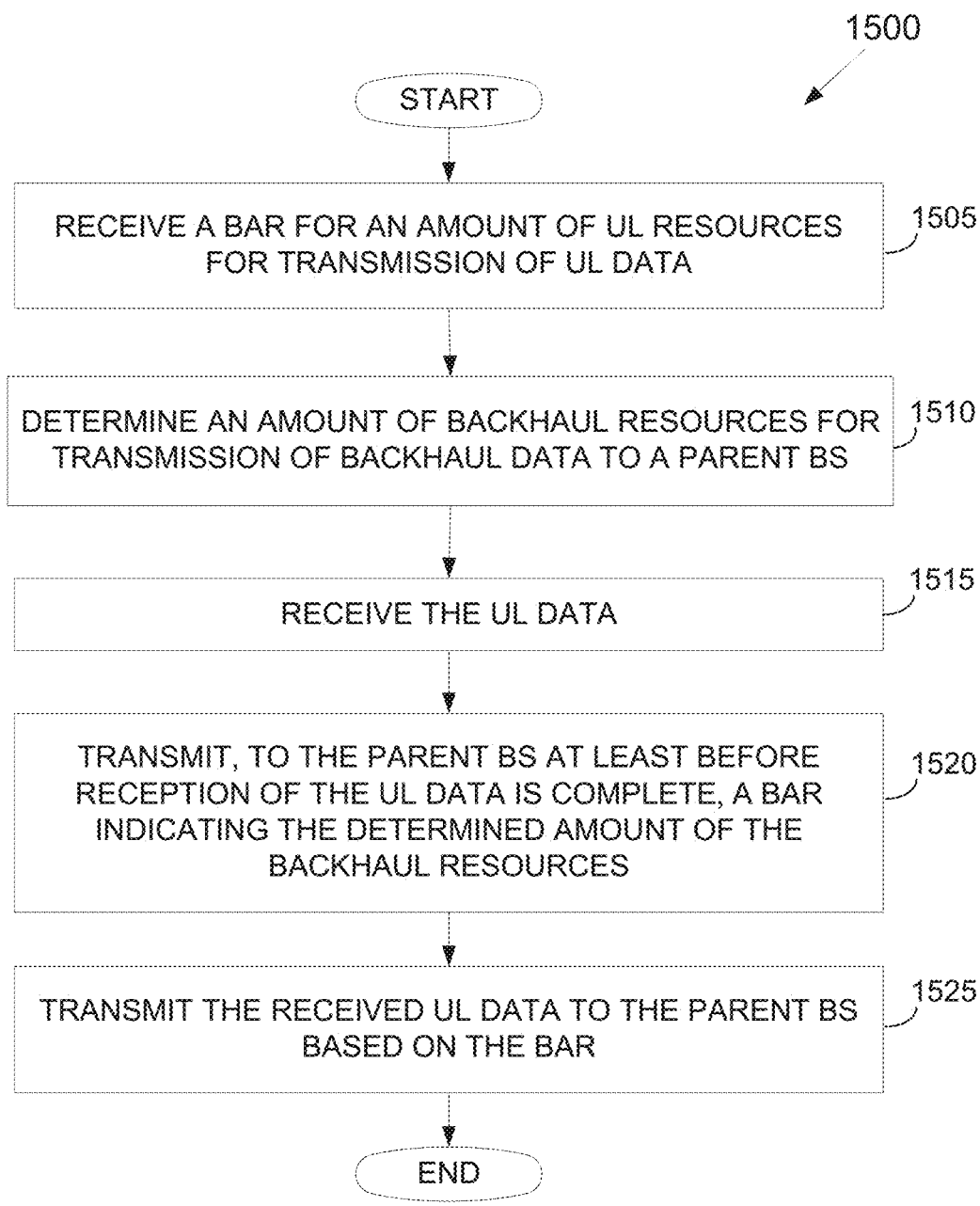
FIG. 15 illustrates an example of a method for transmitting and receiving BARs in a wireless communication network according to embodiments of the present disclosure.

FIG. 15 illustrates an example of a method 1500 for method for transmitting and receiving BARs in a wireless communication network, as may be performed by a BS (e.g. 101-103 as illustrated in FIG. 1). The embodiment of the method 1500 illustrated in FIG. 15 is for illustration only. FIG. 15 does not limit the scope of the present disclosure to any particular implementation.

The method 1500 begins with the BS receiving a BAR for an amount of UL resources for transmission of UL data to the BS (step 1505). For example, in step 1505, the BAR and the UL data may be received from a UE or a child BS of the BS and the UL resources can be an amount of bandwidth on an access link or backhaul link.

Thereafter, the BS determines an amount of backhaul resources for transmission of backhaul data to a parent BS (step 1510). For example, in step 1510, the BS determines the amount of resources needed by the BS on the wireless backhaul to transmit its data (e.g., based on actual/expected buffer size) and data received from down steam nodes (e.g., child BSs or UEs) based the BARs the BS received. For virtual BARs, the BS may determine a time (e.g., K) by when the backhaul resources are desired from the parent BS and determine, based on the received BAR, an amount of the UL data (e.g., M) expected to be received from the UE or the child BS by the determined time. Here, the determined amount of the backhaul resources for transmission of the backhaul data from the BS to the parent BS can be determining the amount of the backhaul resources to request via the first BAR based on the determined amount of the UL data expected to be received from the UE or the child BS by the determined time (i.e., determining K and or M as discussed above).

The BS then receives the UL data (step 1515). For example, in step 1515, the BS may receive the data before or after transmitting its own BAR for backhaul resources to forward up the UL data the BS receives.

Thereafter, the BS transmits, to the parent BS at least before reception of the UL data is complete, a BAR indicating the determined amount of the backhaul resources (step 1520). For example, in step 1520, various triggers may be used by the BS to trigger the BAR transmission. For example, the BS may be triggered to generate and transmit the BAR based on at least one of: reception of the UL data, reception of an amount of the UL data exceeding a buffer threshold, a periodic interval, reception of higher priority data than data buffered at the BS, reception of the UL BAR, and prior to reception of the UL data.

In embodiments for actual BAR procedures, the BAR is for a first portion of the UL data and is transmitted to the parent BS after reception of the first portion of the UL data from the UE or the child BS but before reception of the UL data is complete. The BS may further transmit, to the parent BS, a second BAR for a second portion of the UL data after reception of the second portion of the UL data from the UE or the child BS, etc. In embodiments for virtual BAR procedures, the BS transmits the BAR to the parent BS before reception of any of the UL data from the UE or the child BS (e.g., based on projections or estimates from the BARs received). For example, a first portion of the UL data received can be transmitted to the parent BS via the wireless backhaul connection before reception of an entirety of the UL data indicated in the BAR received by the BS. In various embodiments, both actual BAR and virtual BAR procedures, may be implemented. For example, the BS may start with a virtual BAR a first portion of the UL data expected to be received (e.g., as indicated in a received BAR) and may then transmit, to the parent BS, an actual BAR for a second portion of the UL data received before reception of an entirety of the UL data from the UE or the child BS. In various embodiments, the transmitted BAR includes timing and resource amount pairs. Each pair can indicate a requested time for the backhaul resources and an amount of the backhaul resources requested for the requested time where the total amount of the backhaul resources indicated in the BAR is a sum of the amounts of the backhaul resources for the requested times.

In various embodiments, the BS may forward/combine the BARs it received. For example, the BS may be configured by a central network entity such as a core network 910 or a gateway BS 902 to perform BAR forwarding or combining. For example, in embodiments for BAR forwarding, the BS may receive, from the central network entity, a message configuring BAR forwarding; identify, based on the message, a BAR forwarding duration; determine, based on the message configuring BAR forwarding, to forward the BAR; and transmit, based on the identified BAR forwarding duration and the configuration to forward the BAR, the BAR received from the UE or the child BS to the parent BS. As another example, in embodiments for BAR combining, the BS may receive, from the central network entity, a message configuring BAR combining; determine, based on the message, whether to combine BARs; and include, based on the configuration to forward the BAR, the amount of UL resources indicated in BAR with the determined amount of the backhaul resources for the BS in the BAR transmitted to the parent BS. In embodiments for BAR combining, the BS may include the amount of UL resources indicated in received BAR with the determined amount of the backhaul resources for the BS in the BAR transmitted to the parent BS by combining contents of the received UL BAR with contents of the first BAR based on, for example, (i) quality of service class or (ii) link type between access and backhaul links. Additionally, various triggers may be used to trigger BAR forwarding. For example, the BAR is forwarded to the parent BS by the BS based on at least one of: the amount of UL resources requested in the UL BAR exceeding a threshold, a former parent BS of the BS being switched to the parent BS, a change in a path metric to a gateway BS exceeding a threshold, and a change in a link condition to the parent BS exceeding a threshold.

The BS then transmits the received UL data to the parent BS based on the BAR (step 1525). For example, in step 1525, the BS forwards the UL data received as well as any other backhaul data via the wireless backhaul connection to the parent BS. This backhaul transmission may be based on an explicit grant of the BAR from the parent BS or may be transmitted without an explicit grant.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) in a wireless communication network, the BS comprising:
 a transceiver configured to receive an uplink (UL) bandwidth allocation request (BAR) for an amount of UL resources for transmission of UL data to the BS; and
 a processor operably connected to the transceiver, the processor configured to determine, based at least in part on the UL BAR, an amount of backhaul resources for transmission of backhaul data from the BS to a parent BS of the BS via a wireless backhaul connection,
 wherein the transceiver is further configured to:
  receive the UL data;
  transmit, to the parent BS at least before reception of the UL data is complete, a first BAR indicating the determined amount of the backhaul resources; and
  transmit the received UL data to the parent BS via the wireless backhaul connection based on the first BAR.

2. The BS of claim 1, wherein:
 the UL BAR and the UL data are received from a user equipment (UE) or a child BS of the BS, the first BAR is for a first portion of the UL data and is transmitted to the parent BS after reception of the first portion of the UL data from the UE or the child BS, and the transceiver is further configured to transmit, to the parent BS, a second BAR for a second portion of the UL data after reception of the second portion of the UL data from the UE or the child BS.

3. The BS of claim 1, wherein:

the UL BAR and the UL data are received from a user equipment (UE) or a child BS of the BS, the first BAR is transmitted to the parent BS before reception of any of the UL data from the UE or the child BS, and a first portion of the UL data received is transmitted to the parent BS via the wireless backhaul connection before reception of an entirety of the UL data indicated in the UL BAR.

4. The BS of claim 3, wherein the processor is configured to:

determine, based on the UL BAR, a time when the backhaul resources are desired from the parent BS, determine, based on the UL BAR, an amount of the UL data expected to be received from the UE or the child BS by the determined time, and determine the amount of the backhaul resources to request via the first BAR based on the determined amount of the UL data expected to be received from the UE or the child BS by the determined time.

5. The BS of claim 3, wherein:

the first BAR is for the first portion of the UL data, and the transceiver is further configured to transmit, to the parent BS, a second BAR for a second portion of the UL data before reception of an entirety of the second portion of the UL data from the UE or the child BS.

6. The BS of claim 3, wherein:

the first BAR includes timing and resource amount pairs, each pair indicates a requested time for the backhaul resources and an amount of the backhaul resources requested for the requested time, and the determined amount of the backhaul resources indicated in the first BAR is a sum of the amounts of the backhaul resources for the requested times.

7. The BS of claim 1, wherein:

the UL BAR is received from a UE or a child BS of the BS, the transceiver is configured to receive, from a central network entity, a message regarding BAR forwarding, the processor is configured to:

identify, based on the message regarding BAR forwarding, a BAR forwarding duration; and determine, based on the message regarding BAR forwarding, whether to forward or combine the UL BAR, and the transceiver is configured to transmit, based on the identified BAR forwarding duration and a determination to forward the UL BAR, the UL BAR received from the UE or the child BS to the parent BS.

8. The BS of claim 1, wherein:

the UL BAR is received from a UE or a child BS of the BS, the transceiver is configured to receive, from a central network entity, a message regarding BAR combining, and the processor is configured to:

determine, based on the message regarding BAR combining, whether to forward or combine the UL BAR; and include, based on a determination to forward the UL BAR, the amount of UL resources indicated in UL BAR with the determined amount of the backhaul resources for the BS in the first BAR transmitted to the parent BS.

9. The BS of claim 8, wherein the processor is configured to combine contents of the received UL BAR with contents of the first BAR based on (i) quality of service class or (ii) link type between access and backhaul links.

10. The BS of claim 1, wherein:

the UL BAR is forwarded to the parent BS by the BS based on at least one of: the amount of UL resources requested in the UL BAR exceeding a threshold, a former parent BS of the BS being switched to the parent BS, a change in a path metric to a gateway BS exceeding a threshold, and a change in a link condition to the parent BS exceeding a threshold; and the first BAR is generated and transmitted based on at least one of: reception of the UL data, reception of an amount of the UL data exceeding a buffer threshold, a periodic interval, reception of higher priority data than data buffered at the BS, reception of the UL BAR, and prior to reception of the UL data.

11. A method for operating a base station (BS) in a wireless communication network, the method comprising:

receiving an uplink (UL) bandwidth allocation request (BAR) for an amount of UL resources for transmission of UL data to the BS;

determining, based at least in part on the UL BAR, an amount of backhaul resources for transmission of backhaul data from the BS to a parent BS of the BS via a wireless backhaul connection, receiving the UL data;

transmitting, to the parent BS at least before reception of the UL data is complete, a first BAR indicating the determined amount of the backhaul resources; and transmitting the received UL data to the parent BS via the wireless backhaul connection based on the first BAR.

12. The method of claim 11, wherein:

the UL BAR and the UL data are received from a user equipment (UE) or a child BS of the BS, the first BAR is for a first portion of the UL data and is transmitted to the parent BS after reception of the first portion of the UL data from the UE or the child BS, and the method further comprises transmitting, to the parent BS, a second BAR for a second portion of the UL data after reception of the second portion of the UL data from the UE or the child BS.

13. The method of claim 11, wherein:

the UL BAR and the UL data are received from a user equipment (UE) or a child BS of the BS, the first BAR is transmitted to the parent BS before reception of any of the UL data from the UE or the child BS, and a first portion of the UL data received is transmitted to the parent BS via the wireless backhaul connection before reception of an entirety of the UL data indicated in the UL BAR.

14. The method of claim 13, further comprising:

determining, based on the UL BAR, a time when the backhaul resources are desired from the parent BS; and determining, based on the UL BAR, an amount of the UL data expected to be received from the UE or the child BS by the determined time, wherein determining the amount of the backhaul resources for transmission of the backhaul data from the BS to the parent BS comprises determining the amount of the backhaul resources to request via the first BAR based on the determined amount of the UL data expected to be received from the UE or the child BS by the determined time.

15. The method of claim 13, wherein the first BAR is for the first portion of the UL data, the method further comprising transmitting, to the parent BS, a second BAR for a second portion of the UL data before reception of an entirety of the second portion of the UL data from the UE or the child BS.

16. The method of claim 13, wherein:
the first BAR includes timing and resource amount pairs,
each pair indicates a requested time for the backhaul resources and an amount of the backhaul resources requested for the requested time, and
the determined amount of the backhaul resources indicated in the first BAR is a sum of the amounts of the backhaul resources for the requested times.

17. The method of claim 11, wherein the UL BAR is received from a UE or a child BS of the BS, the method further comprising:
receiving, from a central network entity, a message regarding BAR forwarding;
identifying, based on the message regarding BAR forwarding, a BAR forwarding duration;
determining, based on the message regarding BAR forwarding, whether to forward or combine the UL BAR; and
transmitting, based on the identified BAR forwarding duration and a determination to forward the UL BAR, the UL BAR received from the UE or the child BS to the parent BS.

18. The method of claim 11, wherein the UL BAR is received from a UE or a child BS of the BS, the method further comprising:

receiving, from a central network entity, a message regarding BAR combining;
determining, based on the message regarding BAR combining, whether to forward or combine the UL BAR; and
including, based on a determination to forward the UL BAR, the amount of UL resources indicated in UL BAR with the determined amount of the backhaul resources for the BS in the first BAR transmitted to the parent BS.

19. The method of claim 18, wherein including the amount of UL resources indicated in UL BAR with the determined amount of the backhaul resources for the BS in the first BAR transmitted to the parent BS comprises combining contents of the received UL BAR with contents of the first BAR based on (i) quality of service class or (ii) link type between access and backhaul links.

20. The method of claim 11, wherein:
the UL BAR is forwarded to the parent BS by the BS based on at least one of: the amount of UL resources requested in the UL BAR exceeding a threshold, a former parent BS of the BS being switched to the parent BS, a change in a path metric to a gateway BS exceeding a threshold, and a change in a link condition to the parent BS exceeding a threshold; and
the first BAR is generated and transmitted based on at least one of: reception of the UL data, reception of an amount of the UL data exceeding a buffer threshold, a periodic interval, reception of higher priority data than data buffered at the BS, reception of the UL BAR, and prior to reception of the UL data.

* * * * *